United States Patent
Chen et al.

(10) Patent No.: US 11,395,185 B2
(45) Date of Patent: Jul. 19, 2022

(54) EXTREME HIGH THROUGHPUT SIGNALING STRUCTURE

(71) Applicant: Intel Corporation, Santa Clara, CA (US)

(72) Inventors: Xiaogang Chen, Portland, OR (US); Qinghua Li, San Ramon, CA (US); Thomas J. Kenney, Portland, OR (US); Feng Jiang, Santa Clara, CA (US); Laurent Cariou, Portland, OR (US); Ziv Avital, Kadima (IL); Chen Kojokaro, Yoqneam Illit (IL); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/894,536

(22) Filed: Jun. 5, 2020

(65) Prior Publication Data

US 2020/0305024 A1 Sep. 24, 2020

Related U.S. Application Data

(60) Provisional application No. 62/914,686, filed on Oct. 14, 2019, provisional application No. 62/857,920, filed on Jun. 6, 2019.

(51) Int. Cl.
*H04W 28/06* (2009.01)
*H04L 5/00* (2006.01)
*H04W 72/04* (2009.01)
*H04W 76/10* (2018.01)

(52) U.S. Cl.
CPC ......... *H04W 28/065* (2013.01); *H04L 5/0046* (2013.01); *H04W 72/0453* (2013.01); *H04W 76/10* (2018.02)

(58) Field of Classification Search
CPC ........... H04W 28/065; H04W 72/0453; H04W 76/10; H04W 84/12; H04W 74/006; H04W 72/0446; H04W 72/0493; H04L 5/0046
See application file for complete search history.

(56) References Cited

U.S. PATENT DOCUMENTS

2020/0404549 A1* 12/2020 Verma .................... H04W 48/20
2021/0111855 A1*  4/2021 Verma ............... H04W 72/0446
2021/0250125 A1*  8/2021 Park .................... H04L 27/2603

* cited by examiner

*Primary Examiner* — Thai Nguyen
(74) *Attorney, Agent, or Firm* — Eversheds Sutherland (US) LLP

(57) ABSTRACT

This disclosure describes systems, methods, and devices related to an extreme high throughput (EHT) signaling structure. A device may establish a communication channel with one or more station devices (STAs). The device may generate an extreme high throughput signal field (EHT-SIG) of a header, wherein the EHT-SIG field comprises information associated with resource allocations (RUs). The device may generate a frame comprising the header. The device may assign a first RU to a first station device. The device may assign a second RU to the first station device, wherein the first RU or the second RU is an aggregation of a 26-tome RU and a neighboring RU. The device may cause to send the frame to the first station device.

14 Claims, 15 Drawing Sheets

| | #1 | #2 | #3 | #4 | #5 | #6 | #7 | #8 | #9 | Number of entries |
|---|---|---|---|---|---|---|---|---|---|---|
| 11be MRU (Large RU) | 501 → 484 + 996 | | | | | | | | | 3 |
| | 484 + 242 | | | | | | | | | 3 |
| | 996*2 | | | | | | | | | 3 |
| | 996*3 | | | | | | | | | 3 |
| | 996 + 484 + 242 | | | | | | | | | 3 |
| | 502 → ...... | | | | | | | | | 3 |
| | | | | | | | | | | 3 |
| | | | | | | | | | | 3 |
| 11be MRU (Small RU) | 26 | 78 | | 26 | 26 | 26 | 26 | 26 | | 1 |
| | 26 | 78 | | 26 | 26 | 26 | 52 | | | 1 |
| | 26 | 78 | | 26 | 52 | 26 | 26 | | | 1 |
| | 26 | 78 | | 26 | 52 | 52 | | | | 1 |
| | 504 → 26 | 26 | 26 | 26 | 26 | 78 | | 26 | | 1 |
| | 52 | | 26 | 26 | 26 | 78 | | 26 | | 1 |
| | 26 | 26 | 52 | | 26 | 78 | | 26 | | 1 |
| | 52 | | 52 | | 26 | 78 | | 26 | | 1 |
| | 26 | 78 | | 26 | 78 | | 26 | | | 1 |
| | reserved | | | | | | | | | 1 |
| | 26 | 78 | | 26 | 106 | | | | | 1 |
| | 106 | | 26 | 78 | | 26 | | | | 1 |
| | 132 | | 26 | 26 | 26 | 26 | | | | 1 |
| | 132 | | 26 | 26 | 52 | | | | | 1 |
| | 132 | | 52 | | 26 | 26 | | | | 1 |
| | 506 → 132 | | 52 | | 52 | | | | | 1 |
| | 26 | 26 | 26 | 26 | 132 | | | | | 1 |
| | 52 | | 26 | 26 | 132 | | | | | 1 |
| | 26 | 26 | 52 | | 132 | | | | | 1 |
| | 52 | | 52 | | 132 | | | | | 1 |
| | 26 | 78 | | 132 | | | | | | 1 |
| | 132 | | 78 | | 26 | | | | | 1 |
| | 132 | | 106 | | | | | | | 1 |
| | 106 | | 132 | | | | | | | 1 |

FIG. 5

EXTREME HIGH THROUGHPUT SIGNALING STRUCTURE

CROSS-REFERENCE TO RELATED APPLICATION(S)

This application claims the benefit of U.S. Provisional Application No. 62/857,920, filed Jun. 6, 2019, and U.S. Provisional Application No. 62/914,686, filed Oct. 14, 2019, both disclosures of which are incorporated herein by reference as if set forth in full.

TECHNICAL FIELD

This disclosure generally relates to systems and methods for wireless communications and, more particularly, to an extreme high throughput (EHT) signaling structure.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIG. 5 depicts an illustrative schematic diagram for EHT signaling structure, in accordance with one or more example embodiments of the present disclosure.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in or substituted for, those of other embodiments. Embodiments set forth in the claims encompass all available equivalents of those claims.

Very likely, the resource indication (RU allocation) in IEEE 802.11be (referred to as extreme high throughput (EHT)) will reuse or partially reuse the structure of HE-SIGB defined in 802.11ax. That is, an STA will decode and parse an EHT-SIG field that will consist of a common field and User field to determine the RU allocation to the STA. However, there are several major differences in RU allocation allowed between 802.11ax (hereinafter "11ax") and 802.11be (hereinafter "11be"); specific examples are the non-contiguous RU allocation enabled in 11be, and the new 320 MHz bandwidth support, etc. This disclosure proposes the RU indication required to support these new features in 11be. No previous solutions are known yet.

The current proposal of Multi-AP joint transmission assumes the same content are transmitted from multiple APs simultaneously. Such that a strict synchronization between multiple APs is required. These strict synchronization, after some analysis, are even out of the capability of the hardware.

Example embodiments of the present disclosure relate to systems, methods, and devices for signaling (SIG) structure in extreme high throughput (EHT).

New signaling that needs to be addressed to support RU allocations: 1) 160 MHz SU transmission with MU PPDU format; 2) 320 MHz in 6 GHz; 3) 16 spatial streams (SS) in large RU; 4) center 26 tone RU (in each 20 MHz) aggregated with neighbor RU; and 5) 242-tone RU based non-contiguous RU allocation. Additionally, the design will allow signaling to enable other configurations (by allocating other entries), that might be added during the standardization process for 11be.

Other example embodiments of the present disclosure relate to systems, methods, and devices for enhanced multiple APs joint processing.

In one embodiment, an enhanced multiple APs joint processing system may facilitate new modes of multi-AP joint transmission, which include:

1) Different APs transmit different spatial streams (SS). A client device may process multiple SS from multiple APs.

2) Different APs transmit different RUs. A client device may process multiple RUs from multiple APs.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Figure 1:
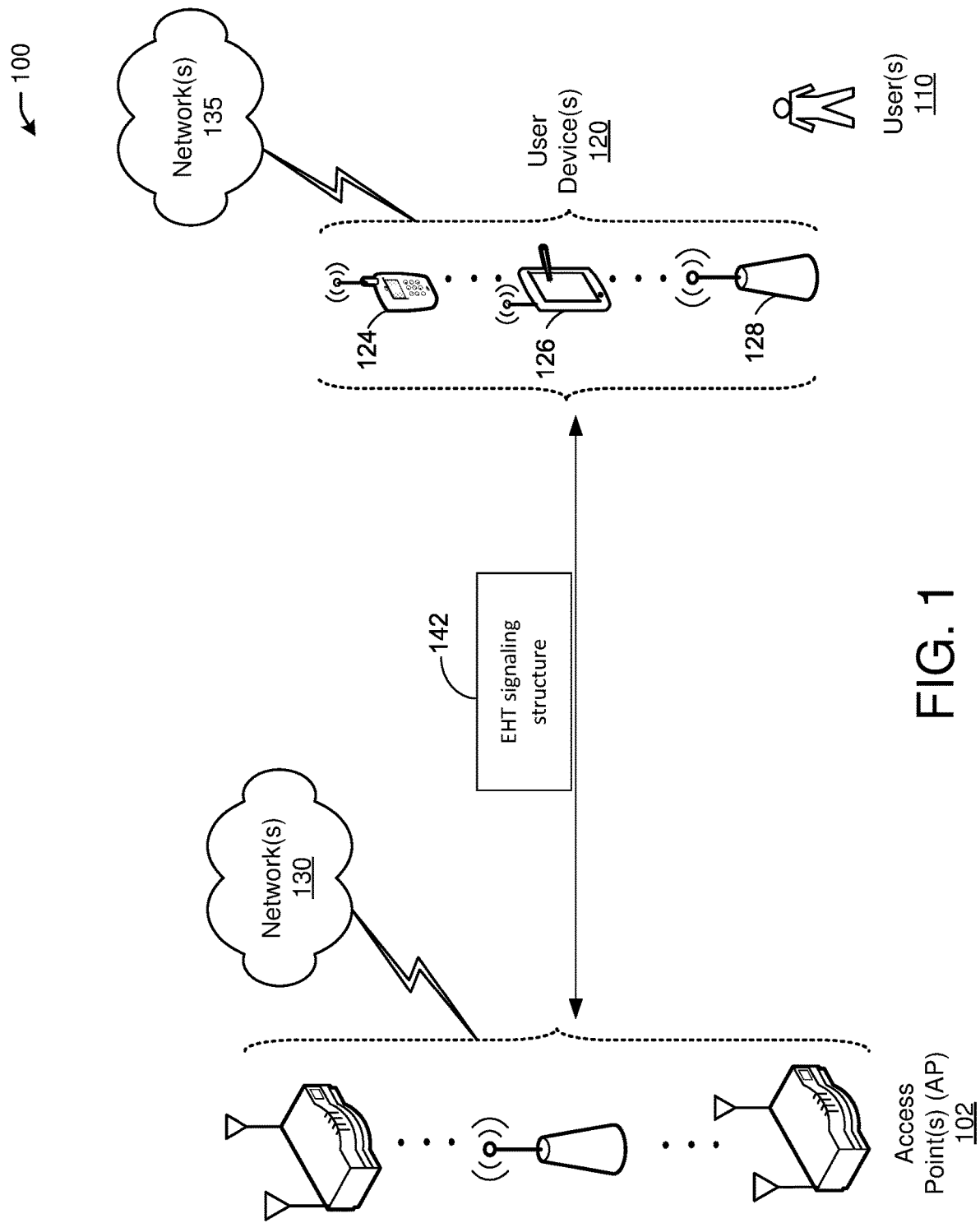
FIG. 1 is a network diagram illustrating an example network environment for extreme high throughput (EHT) signaling structure, in accordance with one or more example embodiments of the present disclosure.

FIG. 1 is a network diagram illustrating an example network environment of EHT signaling structure, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 10:
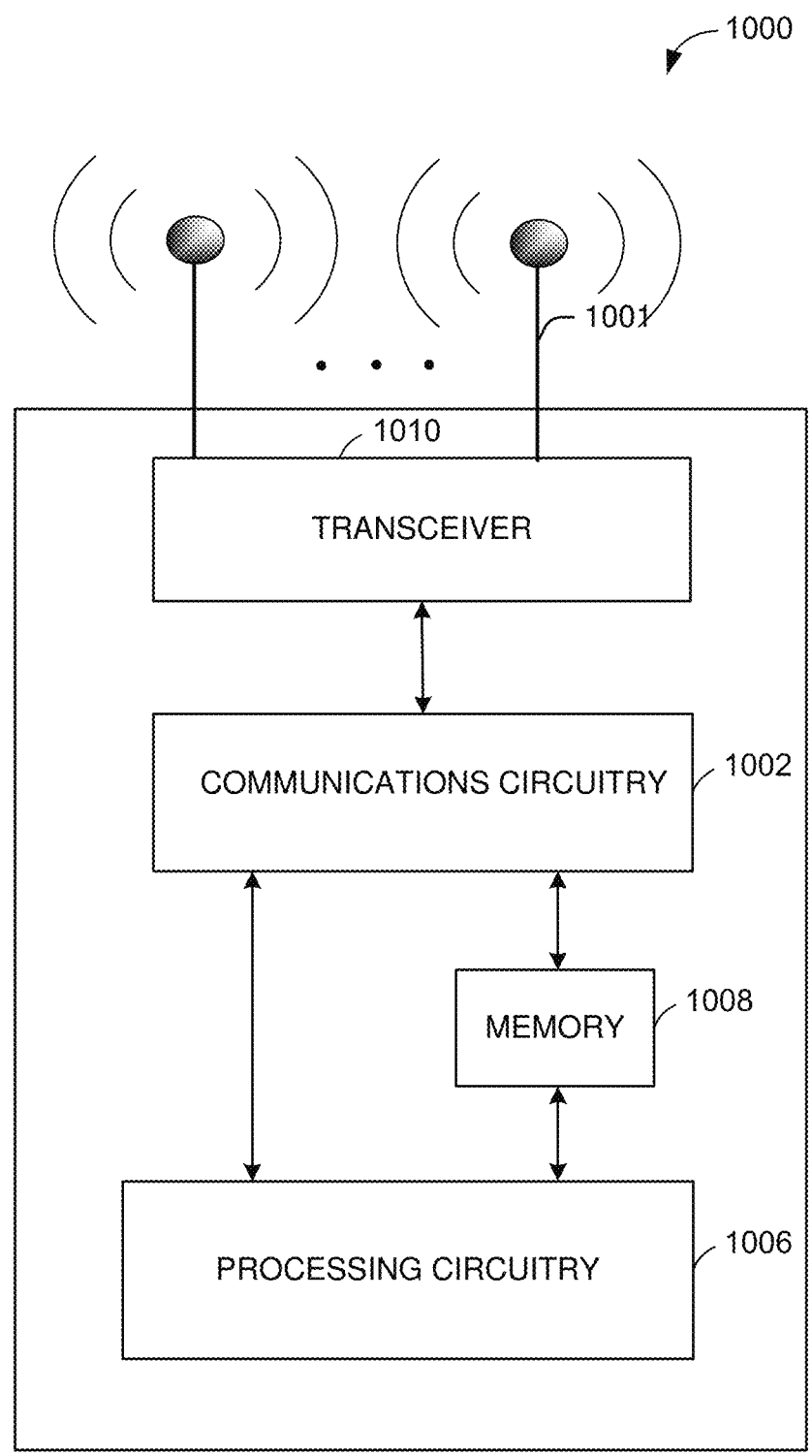
FIG. 10 illustrates a functional diagram of an exemplary communication station that may be suitable for use as a user device, in accordance with one or more example embodiments of the present disclosure.
Figure 11:
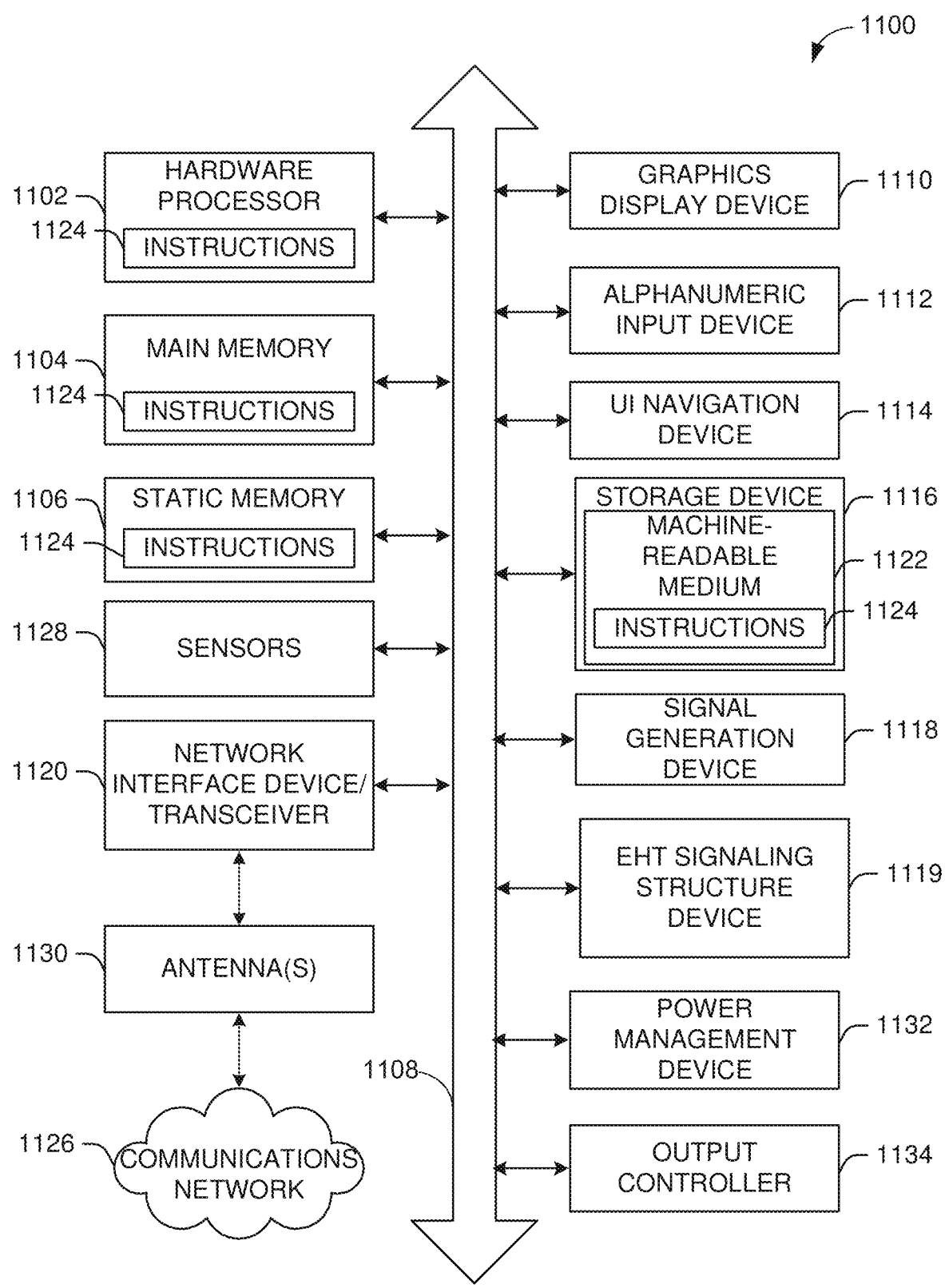
FIG. 11 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 10 and/or the example machine/system of FIG. 11.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.111ax), 5 GHz channels (e.g. 802.11n, 802.11ac, 802.111ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate EHT signaling structure 142 with one or more user devices 120.

It is understood that the above descriptions are for purposes of illustration and are not meant to be limiting.

Figure 2:
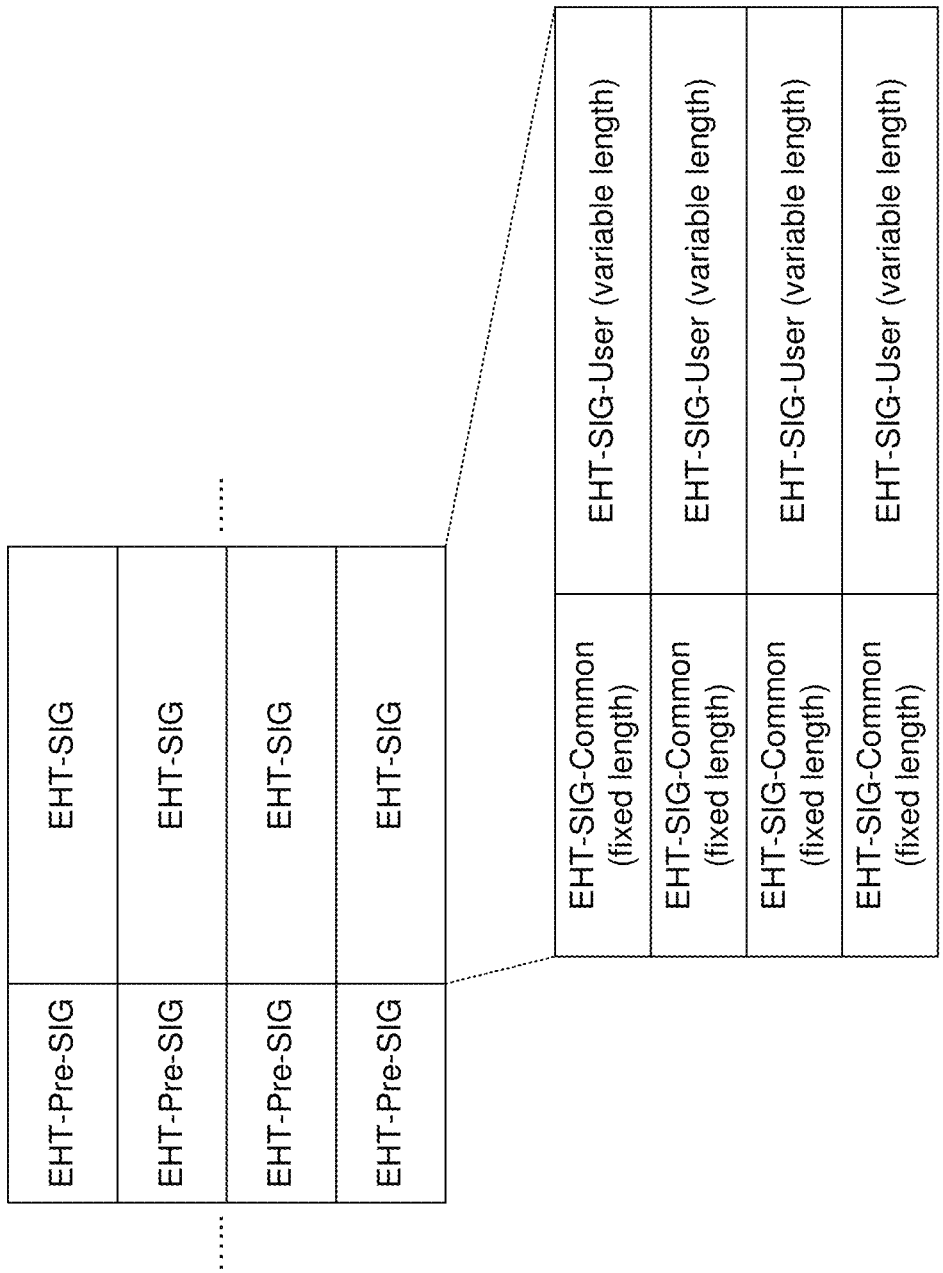
FIG. 2 depicts an illustrative schematic diagram for EHT signaling structure, in accordance with one or more example embodiments of the present disclosure.

FIG. 2 depicts an illustrative schematic diagram for EHT signaling structure, in accordance with one or more example embodiments of the present disclosure.

In orthogonal frequency-division multiple access (OFDMA), a channel is subdivided into smaller channels, or resource units (RUs). This is so there can be simultaneous transmissions to different STAs. Most transmissions are small frames so it is an efficient way to send data by using smaller channels and can have more communications at the same time. These subcarriers (also known as tones), the smaller channels of the main channel, are called resource units. An access point (AP) can allocate varying RUs for multi-user communications. For example, a 20 MHz channel has 242 RUs which can be further split into 2× 106 RUs, 4× 52 RUs, or 9× 26 resource units.

Referring to FIG. 2, there is shown an EHT-SIG field(s) structure.

Very likely, the resource indication (RU allocation) in 11be (EHT) will reuse or partially reuse the structure of HE-SIGB defined in 11ax. That is, a station device (STA) may decode and parse an EHT-SIG field that will consist of a common field and User field to determine the RU allocation to the STA. It should be understood that an EHT-SIG field may be included in an EHT header that is comprised of one or more fields, including the EHT-SIG field. An EHT-SIG field may be comprised of a common portion and a user-specific portion. The common portion may be referred to as EHT-SIG-Common, which may have a fixed length. The user-specific portion may be referred to as EHT-SIG-User, which may have a variable length because it may comprise information for one or more STAs. As mentioned above, it is assumed that EHT-SIG will reuse the HE-SIGB structure (common field and user-specific field) for resource indication. The allocated RU(s) for a given STA is determined by a common field and a user-specific field similar to 11ax.

In the common field, 11ax defines a table (Table 27-26 in 11ax, which is partially shown below as Table 1), which is used to indicate the frequency resource partition and spatial information for all the STAs relevant for this packet. Together with the user field for a specific STA, that STA can determine which RU(s) is allocated to it.

TABLE 1

RU Allocation subfield

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $01001y_2y_1y_0$ | | 106 | | | 26 | 26 | 26 | 52 | | 8 |
| $01010y_2y_1y_0$ | | 106 | | | 26 | 52 | | 26 | 26 | 8 |
| $01011y_2y_1y_0$ | | 106 | | | 26 | 52 | | 52 | | 8 |
| $0110y_1y_0z_1z_0$ | | 106 | | | — | | 106 | | | 16 |
| 01110000 | 52 | | 52 | | — | 52 | | 52 | | 1 |
| 01110001 | | | | 242-tone RU empty (with zero users)(#21036) | | | | | | 1 |
| 01110010 | | | | 484-tone RU; contributes zero User fields to the User Specific field in the same HE-SIG-B content channel as this RU Allocation subfield(#21237) | | | | | | 1 |
| 01110011 | | | | 996-tone RU; contributes zero User fields to the User Specific field in the same HE-SIG-B content channel as this RU Allocation subfield(#21237) | | | | | | 1 |
| $011101x_1x_0$ | | | | Reserved | | | | | | 4 |
| $01111y_2y_1y_0$ | | | | Reserved | | | | | | 8 |
| $10y_2y_1y_0z_2z_1z_0$ | | 106 | | | 26 | | 106 | | | 64 |
| $11000y_2y_1y_0$ | | | | 242 | | | | | | 8 |
| $11001y_2y_1y_0$ | | | | 484 | | | | | | 8 |
| $11010y_2y_1y_0$ | | | | 996 | | | | | | 8 |
| $11011y_2y_1y_0$ | | | | Reserved | | | | | | 8 |
| $111x_4x_3x_2x_1x_0$ | | | | Reserved | | | | | | 32 |

However, the above Table 1 and the information provided is not sufficient to support the following potential features in 11be, which are at least in part:

1) support for 320 MHz OFDMA;

2) support for 160 MHz/320 MHz single user (SU) transmission with multi-user (MU) physical layer (PHY) protocol data unit (PPDU) format;

3) support for 16 spatial streams (SS) in a large resource unit (RU). It may be proposed to enable 16 SS only in RU>=242-tone or even larger. Note that 11ax requires MU-MIMO up to 8 SS in RU>=106-tone;

4) support for aggregating a central 26-tone RU in each 20 MHz with neighbor RU. The motivation for this feature is the frequency resource gain in some cases by aggregating an unused 26-tone RU with a neighboring RU. Specifically, in some cases, the center 26 tone RU (in each 20 MHz) may become an orphan RU and be wasted in the examples of FIG. 3 and FIG. 4. Obviously, for these cases, the AP has to drop the 26-tone RU (it is not allocated and therefore wasted) because it may have additional traffic from other STAs to fill more RUs.

Figure 3:
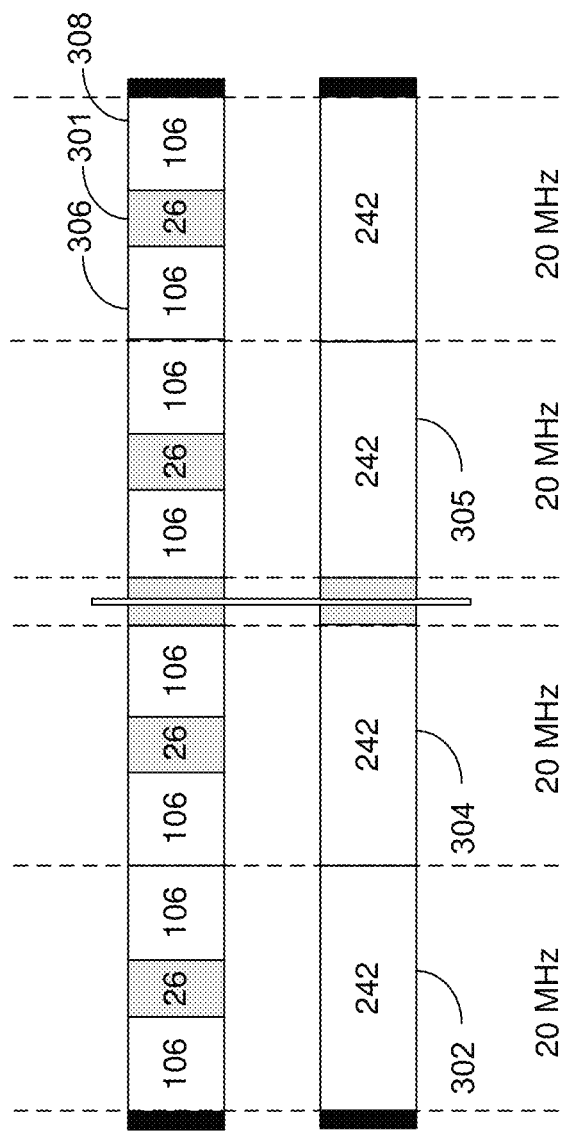
FIG. 3 depicts an illustrative schematic diagram for EHT signaling structure, in accordance with one or more example embodiments of the present disclosure.

FIG. 3 depicts an illustrative schematic diagram for EHT signaling structure, in accordance with one or more example embodiments of the present disclosure.

In the example of FIG. 3, an 80 MHz frequency bandwidth, which is divided into four 20 MHz frequency bandwidth, where within each 20 MHz frequency bandwidth there are one or RUs allocated to one or more STAs. As explained above, every 20 MHz may be comprised of 242-tone RU. For example, STA1 may be allocated a 242-tone RU 302, STA2 may be allocated a 242-tone RU 304, STA3 may be allocated a 242-tone RU 305, STA4 may be allocated a 106-tone RU 306, an STA may be allocated a 106-tone RU 308. However, in this scenario, it is shown that a 26-tone RU 301 is unallocated because it may not be needed. Therefore there is a need to reclaim the wasted 26-tone RU 301.

Figure 4:
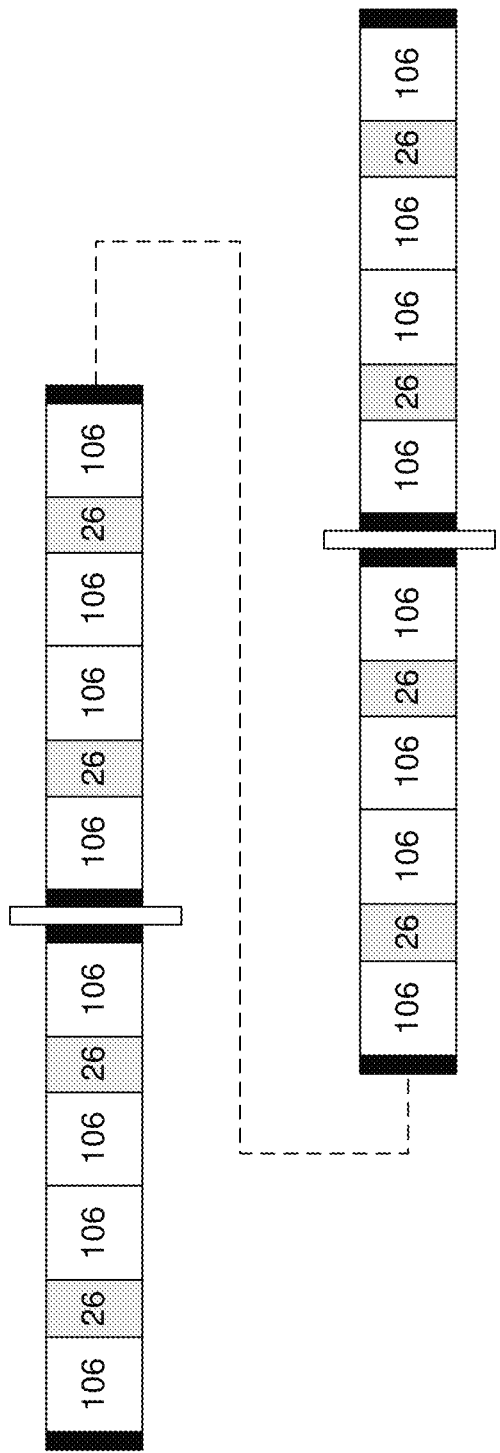
FIG. 4 depicts an illustrative schematic diagram for EHT signaling structure, in accordance with one or more example embodiments of the present disclosure.

FIG. 4 depicts an illustrative schematic diagram for EHT signaling structure, in accordance with one or more example embodiments of the present disclosure.

Referring to FIG. 4, there is shown 16 STAs scheduled in one 160 MHz PPDU. Similar to FIG. 2, some 26-tone RUs would be wasted and therefore should be reclaimed in order to minimize wasted resources and support 11be.

Support is needed for non-contiguous RU allocation, where allocation to an STA does not need to be from consecutive RUs. The allocation to the STA may be from a first 20 MHz and from a second 20 MHz, where the first 20 MHz and the second 20 MHz are not consecutive (e.g. noncontiguous). This is the key difference with 11ax where only contiguous RU allocation is supported. 11be has to support non-contiguous RU allocation in 6 GHz due to puncturing. It has been decided that joint coding will be supported across the non-contiguous RU, such that the non-contiguous RU can be treated as aggregated RU (A-RU) or multiple RU (M-RU). The minimum size of the contiguous RUs that aggregate to an A-RU (aggregated RU) is 242-tones.

In one or more embodiments, a EHT signaling structure system would facilitate adding more entries (repurpose the reserved entries) in table 1 above. For instance, the reserved entries below can be repurposed to support 160 MHz RU allocation for up to 8 SS. If 160 MHz RU supporting 16SS is adopted, then another 8 entries are required. With the same logic, 8 or 16 entries may be needed to support a 320 MHz RU allocation.

| $01111y_2y_1y_0$ | Reserved | 8 |
|---|---|---|

Table 1 lists an example to support the 160/320 MHz by repurposing 16 reserved entries (not shown) in partial table 1 above.

TABLE 1

New entries to support 160 MHz/320 MHz RU allocation

| 01111y2y1y0 | 996 * 2 | 8 |
| 11011y2y1y0 | 996 * 4 | 8 |

In addition, another two entries may be needed: 1) 996× 2-tone RU; which contributes zero User fields to the user-specific field in the same content channel as this RU allocation subfield; 2) 996×4-tone RU; contributes zero User fields to the user-specific field in the same content channel as this RU allocation subfield. It should be understood that other numbers of tone RU may be used. These two entries serve a similar purpose as the one below. Note that there are 52 reserved entries in table 1 (not at all reserved entries are shown).

| 01110011 | 996-tone RU; contributes zero User fields to the User Specific field in the same HE-SIG-B content channel as this RU Allocation subtield(#21237) | 1 |

In one or more embodiments, an EHT signaling structure system would facilitate aggregating a central-26 tone RU with neighbor RU. For example, a EHT signaling structure system may define new RU types: e.g. 26+52=78-tone RU and 26+106=132-tone RU. Then the RU allocation signaling can be done by modifying the existing entries in table 1 as shown in FIG. 4. Entries are redefined as new entries that aggregate a 26-tone RU with either a 52-tone or a 106-tone neighboring RU. That is, every new entry includes a new RU type which is either 26+52 or 26+106. All of these new entries correspond to the possible RU allocation of the new RU types.

Note that the number of new entries is 78 assuming two new RU types are defined. The original 11ax table does not have a sufficient number of reserved entries to accommodate these new allocations. The solution here is that a new or extended table then needs to be defined.

FIG. 5 depicts an illustrative schematic diagram for EHT signaling structure, in accordance with one or more example embodiments of the present disclosure.

Referring to FIG. 5, there is shown a new RU signaling table to support 26-tone RU aggregation with neighbor RUs. For example, as shown in FIG. 5, there are nine possible 26-tone RUs (shown as the header in FIG. 5, e.g., #1, #2, #3, #4, . . . , #9). This table may be used by an AP to allocate resources (RUs) to one or more STAs. Each row of this table shows a combination of a number of tone RU that could be selected by an AP. For example, looking at row 501, an AP may assign or allocate a 996×2-tone RU or any factor of a 996 RU, where the "×2" indicates that it's a factor of two. A 996×2-tone RU contributes zero User fields to the user-specific field in the same content channel as this RU allocation subfield. Looking at row 502, an AP may assign or allocate a 26-tone RU, a 78-tone RU, a 26-tone RU, a 26-tone RU, a 26-tone RU, a 26-tone RU, and a 26-tone RU. In that case, the AP may use that row in the table of FIG. 5 to allocate these resources to STAs that are being served by that AP. Looking at row 504, an AP may assign or allocate a 52-tone RU, a 26-tone RU, a 26-tone RU, a 26-tone RU, a 78-tone RU, and a 26-tone RU. In that case, the AP may use that row in the table of FIG. 5 to allocate these resources to STAs that are being served by that AP. Further, looking at row 506, an AP may assign or allocate a 26-tone RU, a 26-tone RU, a 26-tone RU, a 26-tone RU, and 132-tone RU to STAs that are being served by that AP. It should be understood that for each of these rows, and the other rows in the table of FIG. 5, a 78-tone RU is an aggregation of a 26-tone RU and a 52-tone RU. Further, 132-tone RU is an aggregation of a 26-tone RU and a 106-tone RU. Although rows other than two, 504, and 506 are described, the rest of the rows of the table of FIG. 5 are combinations of RUs that AP can use by selecting one of these rows when determining how to allocate RUs to one or more STAs.

Figure 6:
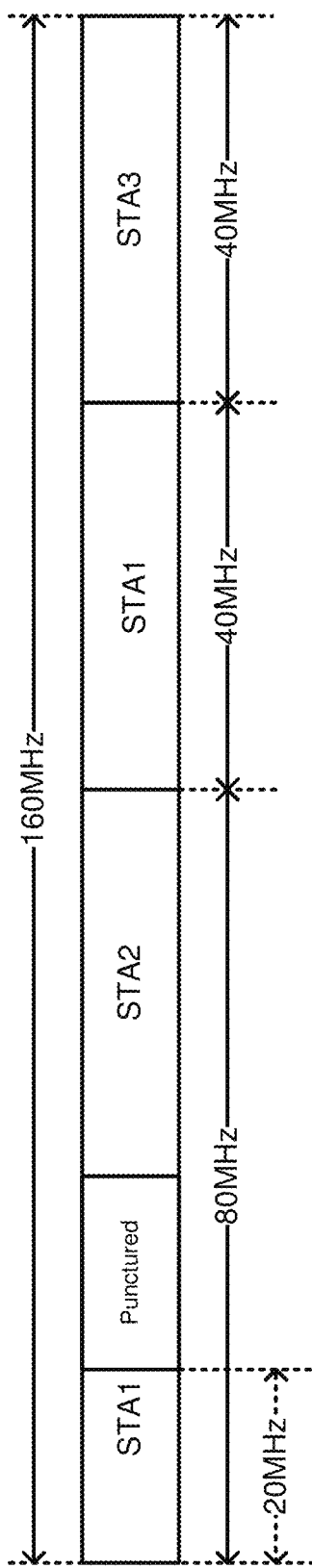
FIG. 6 depicts an illustrative schematic diagram for an example of a non-contiguous RU allocation, in accordance with one or more example embodiments of the present disclosure.

FIG. 6 depicts an illustrative schematic diagram for an example of a non-contiguous RU allocation, in accordance with one or more example embodiments of the present disclosure.

In order to support the 11be of having non-contiguous RU allocations, FIG. 6 may be used as an example of the non-contiguous RU allocation for STA1, for example, two RUs 242-tone and 484-tone RUs are allocated to STA1. The 242+484-tone RU, as long as they are jointly coded, is an aggregated RU (A-RU) (also may be referred to as multiple RU (M-RU).

Three options may be proposed to support this new feature in 11be:

Option 1): Allow an STA to decode multiple user fields that have the same STA-ID which matches the STA-ID of this STA. In the example of FIG. 6, STA 1 is allowed to parse two user fields corresponding to the two RUs highlighted as blue.

This option would then fully reuse the current HE-SIGB structure and is the easiest to implement. But the issue is the SIGB size would be unnecessarily very large especially since MU-MIMO is used. Basically, the user field data is copied to two different entries, where the information is redundant and not needed by the STA to decode the packet. The only information needed is the assignment of the RUs and only one user-specific field.

Figure 7:
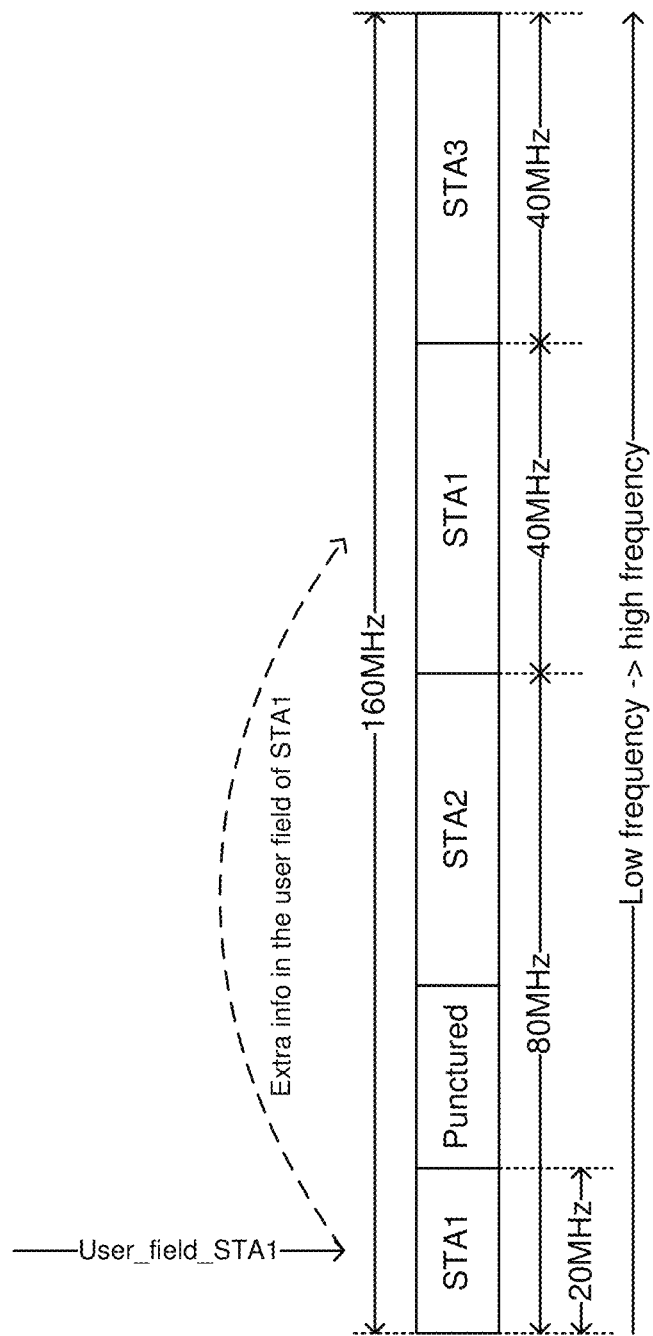
FIG. 7 depicts an illustrative schematic diagram for an example of non-contiguous RU indication, in accordance with one or more example embodiments of the present disclosure.

FIG. 7 depicts an illustrative schematic diagram for an example of non-contiguous RU indication, in accordance with one or more example embodiments of the present disclosure.

Referring to FIG. 7, there is shown Option 2 to support the new features of 11be.

Option 2): In this, the STA would only parse one user field, the one matches its STA-ID, but in the user field there will be more information added for each STA in order to indicate the additional frequency resources.

An example is shown in FIG. 7. One STA has only one user field, and this user field only indicates the resources starting in the lower frequency portion (the 20 MHz RU in this example). In this user field, it may be proposed to add extra info to indicate additional frequency resources allocated to STA 1.

The extra info would include 1) the size of the additional RU: e.g. 242/484/996/996*2-tone RU. In this example it's 484-tone RU; 2) the number of 242-tone RUs between the additional RU and the original RU indicated by the user field (means the gap between the two RUs), e.g. 4 bits to indicate the gap between 0 and 15*242-tone RU. In this example, the gap is 3*242-tone RU including the punctured 242-tone RU and the 484-tone RU assigned to STA2.

If there are more than two non-contiguous RUs allocated to STA1, each additional RU will be indicated by an information pair consisting of size and gap information.

Another alternative for the extra info for additional RU indication is to include a bit map to indicate which 242-tone RU is allocated to an STA. For example, for 160 MHz, an 8-bits bitmap is required, but for 320 MHz, a 16 bits bit map is required. The benefit of this alternative is the size of extra information doesn't change with the number of additional RUs.

This scheme significantly reduces the SIGB size but would then require that each STA needs to parse potentially all user fields that don't match its STA-ID to get the correct RU allocation information.

Option 3): Explicitly define all the aggregated RU (A-RU) combinations in a new table. Using the example in FIG. 7, option 3) means an entry (or entries) may be added in the table of RU allocation subfield (Table 27-26 in 11ax, which is shown partially above as Table 1), the entry indicates: two RUs in FIG. 7, that is, a 20 MHz 242-tone RU and the 40 MHz 484-tone RU, are aggregated as one RU and assigned to STA1 (or several STAs if MU-MIMO is used). The explicit indication needs a large number of entries in the table.

As abovementioned, to support the $4^{th}$ and $5^{th}$ feature, it may not be sufficient to repurpose the reserved entries in Table 1 to meet the requirement due to a large number of new entries. In one or more embodiments, a new table or extended table may be required to be defined.

In one or more embodiments, an EHT signaling structure system may define the 11ax Table 27-26 (shown partially as Table 1 above) as the basic table. And then define a new table to support new features in 11be.

The new table can be either option 1) an extended table that includes all the existing entries of Table 1 and new entries to support the new features in 11be; or option. 2) a table outlining the additional entries required to support the new features in 11be.

For option 2), an early indication is required to indicate which table (the basic table or the new table in option 2) should be used for STAs to determine the RU allocation. For instance, the early indication can be included in the field before EHT-SIG-B, such as the EHT-SIG-A (or equivalent, since the preamble is not yet fully designed).

It is understood that the above descriptions are for purposes of illustration and are not meant to be limiting.

Figure 8B:
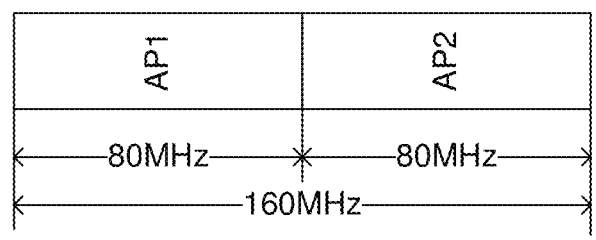
FIGS. 8A and 8B depict illustrative schematic diagrams for enhanced multiple APs joint processing, in accordance with one or more example embodiments of the present disclosure.
Figure 8A:

FIGS. 8A and 8B depict illustrative schematic diagrams for enhanced multiple APs joint processing, in accordance with one or more example embodiments of the present disclosure.

In one or more embodiments, an enhanced multiple APs joint processing system may facilitate that different APs transmit different spatial streams (SS) that address to the same client device (e.g., a user device 120).

The current proposal on joint transmission is mathematically expressed in equation 1. Assuming two SS, s_1 and s_2, will be transmitted to one client. W is the precoding vector applied across the antennas of two APs. H is the channel response of the client.

Assuming the client device has 2 antennas and each AP has 4 antennas, then $$H_{ij} = \begin{bmatrix} h_1 \\ h_2 \\ h_3 \\ h_4 \end{bmatrix}^H, \text{ and } w_{ij} = \begin{bmatrix} w_1 \\ w_2 \\ w_3 \\ w_4 \end{bmatrix}. \quad \text{Equ. (1)}$$

$$Y = H \cdot W + N = \begin{bmatrix} H_{11} & H_{12} \\ H_{21} & H_{22} \end{bmatrix} \cdot \begin{bmatrix} w_{11} & w_{12} \\ w_{21} & w_{22} \end{bmatrix} \cdot \begin{bmatrix} s_1 \\ s_2 \end{bmatrix} + N =$$

$$\begin{bmatrix} (H_{11}w_{11} + H_{12}w_{21}) \cdot s_1 + (H_{11}w_{12} + H_{12}w_{22}) \cdot s_2 \\ (H_{21}w_{11} + H_{22}w_{21}) \cdot s_1 + (H_{21}w_{12} + H_{22}w_{22}) \cdot s_2 \end{bmatrix} + N$$

In one or more embodiments, the proposal of decoupling the transmission from two APs in this disclosure is mathematically expressed in equation 2.

$$Y = H \cdot W + N = \begin{bmatrix} H_1 & 0 \\ 0 & H_2 \end{bmatrix} \begin{bmatrix} w_1 & 0 \\ 0 & w_2 \end{bmatrix} \cdot \begin{bmatrix} s_1 \\ s_2 \end{bmatrix} + N = \begin{bmatrix} H_1 w_1 s_1 \\ H_2 w_2 s_2 \end{bmatrix} + N \quad \text{Equ. (2)}$$

It means the two SS from AP1 and AP2 are completely independent with each other at the receiver and can be easily decoded independently. With this approach, the tight synchronization issue between APs doesn't exist anymore.

The two SS can be coded independently, or the two SS can be coded jointly. The two SS can have different MCS or the same MCS.

From the AP side, each AP needs to be indicated the spatial stream index to use. E.g. AP1 use SS1 to transmit s_1; AP2 use SS2 to transmit s_2.

From client side, a client can decode the two SS as if it's a single user PPDU with two SS.

This mode is very similar to the UL MU-MIMO in 11ax. The single-stream pilot can still be used for carrier frequency offset (CFO) tracking.

Since two SS are transmitted from two APs, there are Tx power gain of −3 dB, which makes it easier to support multiple SS transmission. Note that although two SS are used as an example to explain this option, it can be extended to more than two SS without loss of generality.

In one or more embodiments, an enhanced multiple APs joint processing system may facilitate that different APs transmit different RUs that address to the same client.

As shown in FIG. 8A is the multi-AP joint transmission proposal from external companies. It means, multiple AP use the same frequency resource to transmit the same content.

The proposal option is shown in FIG. 8B. Different APs can use different frequency resources for joint transmission.

From the AP side, the operation is the same as multi-AP OFDMA. Each AP needs to know the frequency resource and MCS to use. The frequency resource assigned to different APs can be different depending on the pass loss from AP to the client. The difference with Multi-AP OFDMA is multiple RUs from multiple AP are addressed to the same client instead of a different client.

From the client side, the client needs to support decoding multiple RUs in one PPDU.

It is understood that the above descriptions are for purposes of illustration and are not meant to be limiting.

Figure 9:
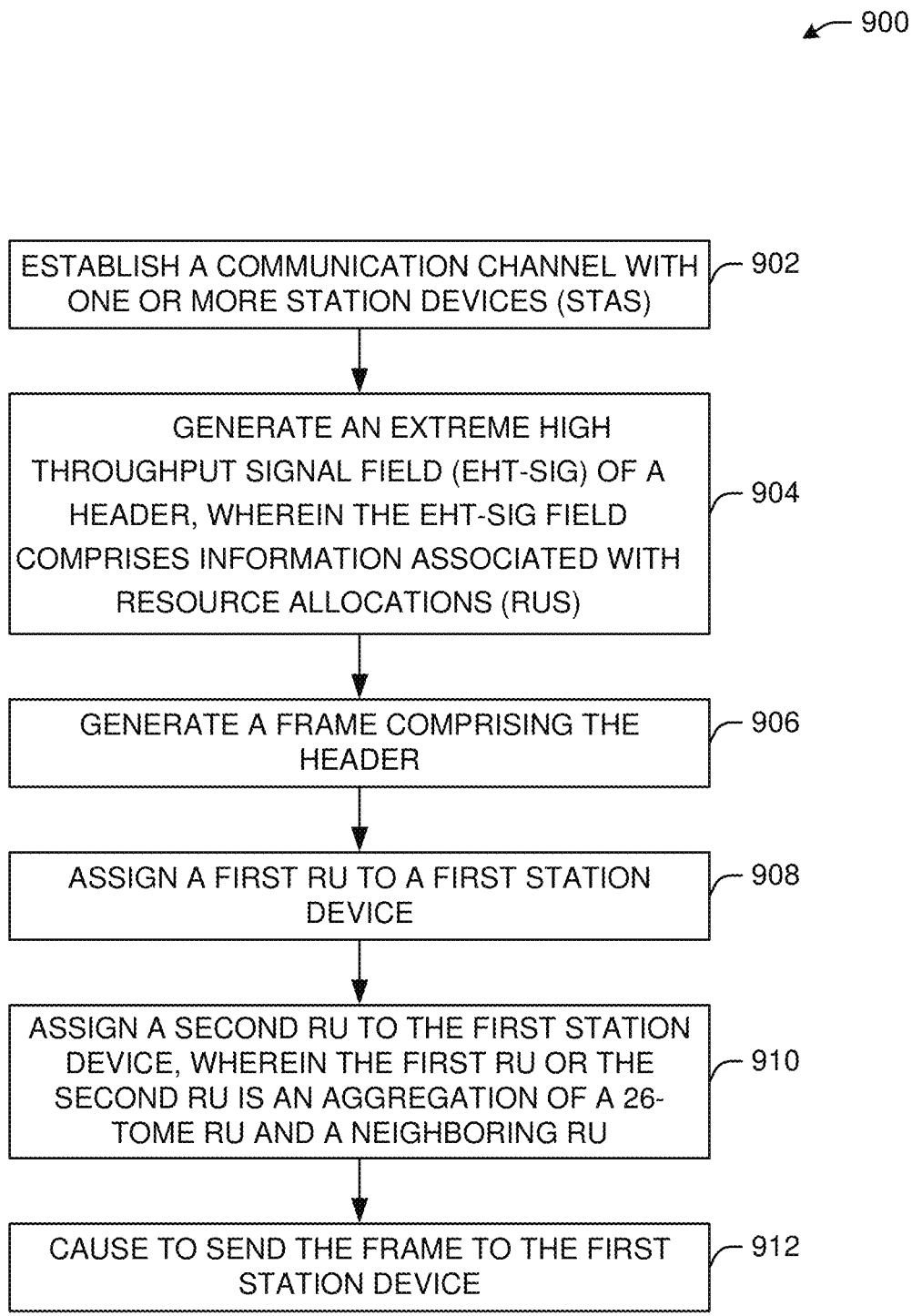
FIG. 9 illustrates a flow diagram of an illustrative process for an EHT signaling structure system, in accordance with one or more example embodiments of the present disclosure.

FIG. 9 illustrates a flow diagram of illustrative process 900 for an EHT signaling structure system, in accordance with one or more example embodiments of the present disclosure.

At block 902, a device (e.g., the user device(s) 120 and/or the AP 102 of FIG. 1) may establish a communication channel with one or more station devices (STAs);

At block 904, the device may generate an extreme high throughput signal field (EHT-SIG) of a header, wherein the EHT-SIG field comprises information associated with resource allocations (RUs). The one or more EHT signaling fields may comprise a common portion and a user-specific portion. The common portion may have a fixed length. The user-specific portion may have a variable length. In some embodiments, one more resource allocations may support 160 MHz resource allocation and 320 MHz resource allocation.

At block 906, the device may generate a frame comprising the header.

At block 908, the device may assign a first RU to a first station device. The first RU and the second RU may be non-contiguous. The first RU may be a 78-tone RU, 132-tone RU, or a 996×2 RU.

At block 910, the device may assign a second RU to the first station device, wherein the first RU or the second RU is an aggregation of a 26-tome RU and a neighboring RU.

At block 912, the device may cause to send the frame to the first station device.

It is understood that the above descriptions are for purposes of illustration and are not meant to be limiting.

FIG. 10 shows a functional diagram of an exemplary communication station 1000, in accordance with one or more example embodiments of the present disclosure. In one embodiment, FIG. 10 illustrates a functional block diagram of a communication station that may be suitable for use as an AP 102 (FIG. 1) or a user device 120 (FIG. 1) in accordance with some embodiments. The communication station 1000 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1000 may include communications circuitry 1002 and a transceiver 1010 for transmitting and receiving signals to and from other communication stations using one or more antennas 1001. The communications circuitry 1002 may include circuitry that can operate the physical layer (PHY) communications and/or medium access control (MAC) communications for controlling access to the wireless medium, and/or any other communications layers for transmitting and receiving signals. The communication station 1000 may also include processing circuitry 1006 and memory 1008 arranged to perform the operations described herein. In some embodiments, the communications circuitry 1002 and the processing circuitry 1006 may be configured to perform operations detailed in the above figures, diagrams, and flows.

In accordance with some embodiments, the communications circuitry 1002 may be arranged to contend for a wireless medium and configure frames or packets for communicating over the wireless medium. The communications circuitry 1002 may be arranged to transmit and receive signals. The communications circuitry 1002 may also include circuitry for modulation/demodulation, upconversion/downconversion, filtering, amplification, etc. In some embodiments, the processing circuitry 1006 of the communication station 1000 may include one or more processors. In other embodiments, two or more antennas 1001 may be coupled to the communications circuitry 1002 arranged for sending and receiving signals. The memory 1008 may store information for configuring the processing circuitry 1006 to perform operations for configuring and transmitting message frames and performing the various operations described herein. The memory 1008 may include any type of memory, including non-transitory memory, for storing information in a form readable by a machine (e.g., a computer). For example, the memory 1008 may include a computer-readable storage device, read-only memory (ROM), random-access memory (RAM), magnetic disk storage media, optical storage media, flash-memory devices and other storage devices and media.

In some embodiments, the communication station 1000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1000 may include one or more antennas 1001. The antennas 1001 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1000 may include one or more of a keyboard, a display, a non-volatile memory port, multiple antennas, a graphics processor, an application processor, speakers, and other mobile device elements. The display may be an LCD screen including a touch screen.

Although the communication station 1000 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1000 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1000 may include one or more processors and may be configured with instructions stored on a computer-readable storage device.

FIG. 11 illustrates a block diagram of an example of a machine 1100 or system upon which any one or more of the techniques (e.g., methodologies) discussed herein may be performed. In other embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed)

network environments. The machine 1100 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (i.e., drive unit) 1116, a signal generation device 1118 (e.g., a speaker), a EHT signaling structure device 1119, a network interface device/transceiver 1120 coupled to antenna(s) 1130, and one or more sensors 1128, such as a global positioning system (GPS) sensor, a compass, an accelerometer, or other sensor. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1102 for generation and processing of the baseband signals and for controlling operations of the main memory 1104, the storage device 1116, and/or the EHT signaling structure device 1119. The baseband processor may be provided on a single radio card, a single chip, or an integrated circuit (IC).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

The EHT signaling structure device 1119 may carry out or perform any of the operations and processes (e.g., process 900) described and shown above.

It is understood that the above are only a subset of what the EHT signaling structure device 1119 may be configured to perform and that other functions included throughout this disclosure may also be performed by the EHT signaling structure device 1119.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/ transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 12:
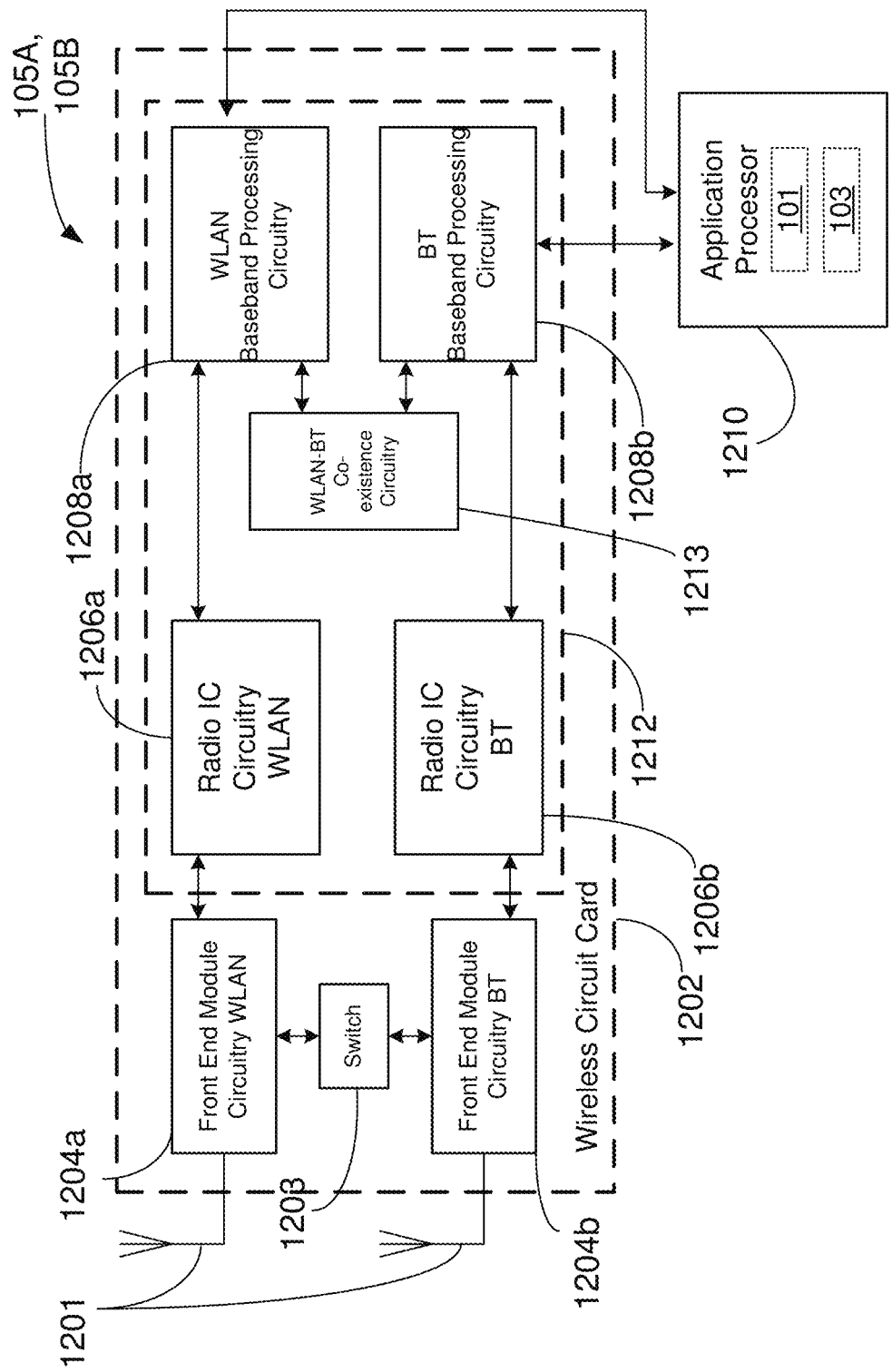
FIG. 12 is a block diagram of a radio architecture in accordance with some examples.

FIG. 12 is a block diagram of a radio architecture 105A, 105B in accordance with some embodiments that may be implemented in any one of the example AP 100 and/or the example STA 102 of FIG. 1. Radio architecture 105A, 105B may include radio front-end module (FEM) circuitry 1204a-b, radio IC circuitry 1206a-b and baseband processing circuitry 1208a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1204a-b may include a WLAN or Wi-Fi FEM circuitry 1204a and a Bluetooth (BT) FEM circuitry 1204b. The WLAN FEM circuitry 1204a may include a receive signal path comprising circuitry configured to operate on WLAN RF signals received from one or more antennas 1201, to amplify the received signals and to provide the amplified versions of the received signals to the WLAN radio IC circuitry 1206a for further processing. The BT FEM circuitry 1204b may include a receive signal path which may include circuitry configured to operate on BT RF signals received from one or more antennas 1201, to amplify the received signals and to provide the amplified versions of the received signals to the BT radio IC circuitry 1206b for further processing. FEM circuitry 1204a may also include a transmit signal path which may include circuitry configured to amplify WLAN signals provided by the radio IC circuitry 1206a for wireless transmission by one or more of the antennas 1201. In addition, FEM circuitry 1204b may also include a transmit signal path which may include circuitry configured to amplify BT signals provided by the radio IC circuitry 1206b for wireless transmission by the one or more antennas. In the embodiment of FIG. 12, although FEM 1204a and FEM 1204b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1206a-b as shown may include WLAN radio IC circuitry 1206a and BT radio IC circuitry 1206b. The WLAN radio IC circuitry 1206a may include a receive signal path which may include circuitry to down-convert WLAN RF signals received from the FEM circuitry 1204a and provide baseband signals to WLAN baseband processing circuitry 1208a. BT radio IC circuitry 1206b may in turn include a receive signal path which may include circuitry to down-convert BT RF signals received from the FEM circuitry 1204b and provide baseband signals to BT baseband processing circuitry 1208b. WLAN radio IC circuitry 1206a may also include a transmit signal path which may include circuitry to up-convert WLAN baseband signals provided by the WLAN baseband processing circuitry 1208a and provide WLAN RF output signals to the FEM circuitry 1204a for subsequent wireless transmission by the one or more antennas 1201. BT radio IC circuitry 1206b may also include a transmit signal path which may include circuitry to up-convert BT baseband signals provided by the BT baseband processing circuitry 1208b and provide BT RF output signals to the FEM circuitry 1204b for subsequent wireless transmission by the one or more antennas 1201. In the embodiment of FIG. 12, although radio IC circuitries 1206a and 1206b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1208a-b may include a WLAN baseband processing circuitry 1208a and a BT baseband processing circuitry 1208b. The WLAN baseband processing circuitry 1208a may include a memory, such as, for example, a set of RAM arrays in a Fast Fourier Transform or Inverse Fast Fourier Transform block (not shown) of the WLAN baseband processing circuitry 1208a. Each of the WLAN baseband circuitry 1208a and the BT baseband circuitry 1208b may further include one or more processors and control logic to process the signals received from the corresponding WLAN or BT receive signal path of the radio IC circuitry 1206a-b, and to also generate corresponding WLAN or BT baseband signals for the transmit signal path of the radio IC circuitry 1206a-b. Each of the baseband processing circuitries 1208a and 1208b may further include physical layer (PHY) and medium access control layer (MAC) circuitry, and may further interface with a device for generation and processing of the baseband signals and for controlling operations of the radio IC circuitry 1206a-b.

Referring still to FIG. 12, according to the shown embodiment, WLAN-BT coexistence circuitry 1213 may include logic providing an interface between the WLAN baseband circuitry 1208a and the BT baseband circuitry 1208b to enable use cases requiring WLAN and BT coexistence. In addition, a switch 1203 may be provided between the WLAN FEM circuitry 1204a and the BT FEM circuitry 1204b to allow switching between the WLAN and BT radios according to application needs. In addition, although the antennas 1201 are depicted as being respectively connected to the WLAN FEM circuitry 1204*a* and the BT FEM circuitry 1204*b*, embodiments include within their scope the sharing of one or more antennas as between the WLAN and BT FEMs, or the provision of more than one antenna connected to each of FEM 1204*a* or 1204*b*.

In some embodiments, the front-end module circuitry 1204*a*-*b*, the radio IC circuitry 1206*a*-*b*, and baseband processing circuitry 1208*a*-*b* may be provided on a single radio card, such as wireless radio card 1202. In some other embodiments, the one or more antennas 1201, the FEM circuitry 1204*a*-*b* and the radio IC circuitry 1206*a*-*b* may be provided on a single radio card. In some other embodiments, the radio IC circuitry 1206*a*-*b* and the baseband processing circuitry 1208*a*-*b* may be provided on a single chip or integrated circuit (IC), such as IC 1212.

In some embodiments, the wireless radio card 1202 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1208*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 13:
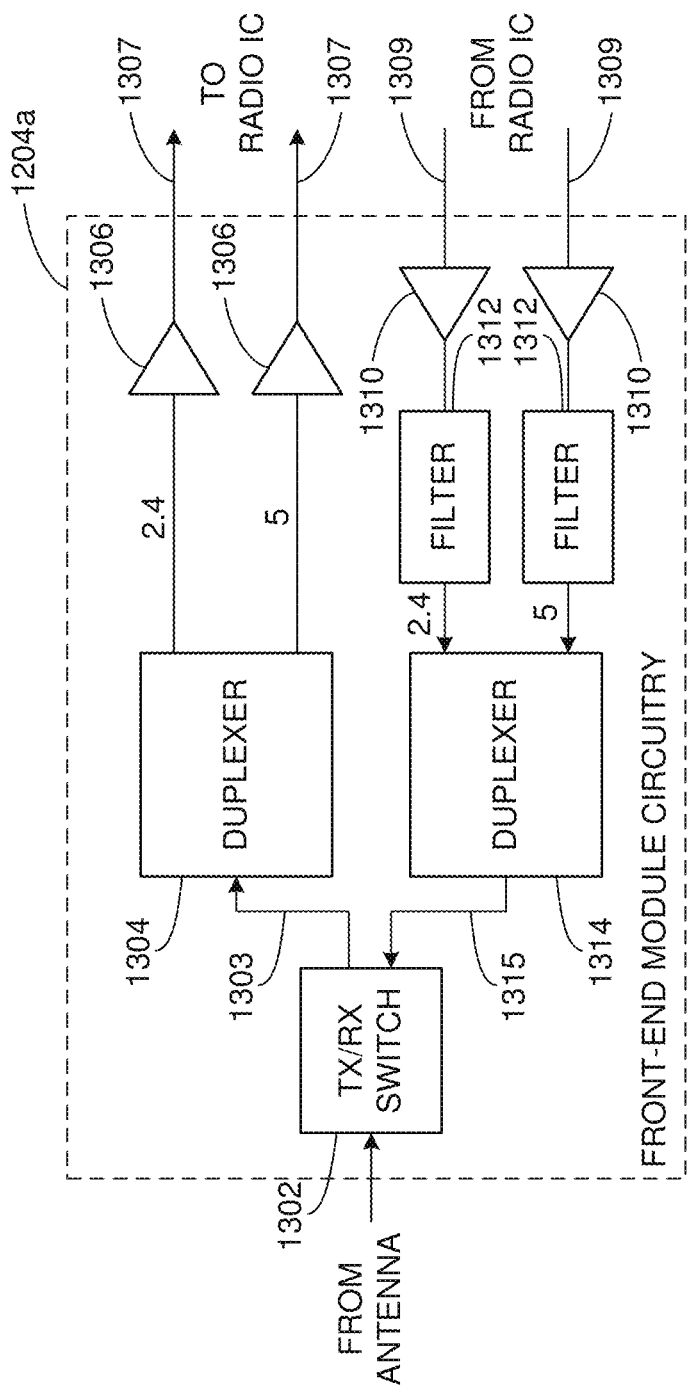
FIG. 13 illustrates an example front-end module circuitry for use in the radio architecture of FIG. 12, in accordance with one or more example embodiments of the present disclosure.

FIG. 13 illustrates WLAN FEM circuitry 1204*a* in accordance with some embodiments. Although the example of FIG. 13 is described in conjunction with the WLAN FEM circuitry 1204*a*, the example of FIG. 13 may be described in conjunction with the example BT FEM circuitry 1204*b* (FIG. 12), although other circuitry configurations may also be suitable.

In some embodiments, the FEM circuitry 1204*a* may include a TX/RX switch 1302 to switch between transmit mode and receive mode operation. The FEM circuitry 1204*a* may include a receive signal path and a transmit signal path. The receive signal path of the FEM circuitry 1204*a* may include a low-noise amplifier (LNA) 1306 to amplify received RF signals 1303 and provide the amplified received RF signals 1307 as an output (e.g., to the radio IC circuitry 1206*a*-*b* (FIG. 12)). The transmit signal path of the circuitry 1204*a* may include a power amplifier (PA) to amplify input RF signals 1309 (e.g., provided by the radio IC circuitry 1206*a*-*b*), and one or more filters 1312, such as band-pass filters (BPFs), low-pass filters (LPFs) or other types of filters, to generate RF signals 1315 for subsequent transmission (e.g., by one or more of the antennas 1201 (FIG. 12)) via an example duplexer 1314.

In some dual-mode embodiments for Wi-Fi communication, the FEM circuitry 1204*a* may be configured to operate in either the 2.4 GHz frequency spectrum or the 5 GHz frequency spectrum. In these embodiments, the receive signal path of the FEM circuitry 1204*a* may include a receive signal path duplexer 1304 to separate the signals from each spectrum as well as provide a separate LNA 1306 for each spectrum as shown. In these embodiments, the transmit signal path of the FEM circuitry 1204*a* may also include a power amplifier 1310 and a filter 1312, such as a BPF, an LPF or another type of filter for each frequency spectrum and a transmit signal path duplexer 1304 to provide the signals of one of the different spectrums onto a single transmit path for subsequent transmission by the one or more of the antennas 1201 (FIG. 12). In some embodiments, BT communications may utilize the 2.4 GHz signal paths and may utilize the same FEM circuitry 1204*a* as the one used for WLAN communications.

Figure 14:
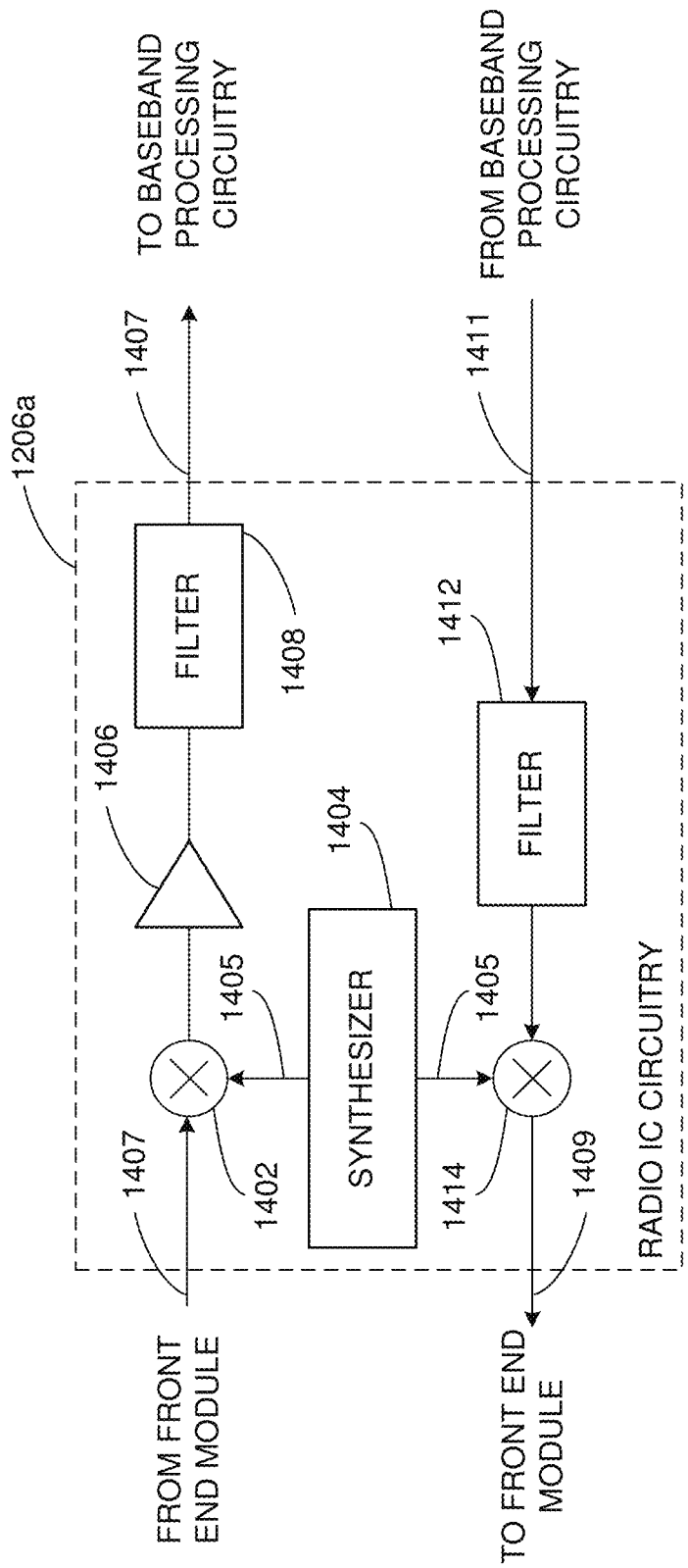
FIG. 14 illustrates an example of radio IC circuitry for use in the radio architecture of FIG. 12, in accordance with one or more example embodiments of the present disclosure.

FIG. 14 illustrates radio IC circuitry 1206*a* in accordance with some embodiments. The radio IC circuitry 1206*a* is one example of circuitry that may be suitable for use as the WLAN or BT radio IC circuitry 1206*a*/1206*b* (FIG. 12), although other circuitry configurations may also be suitable. Alternatively, the example of FIG. 14 may be described in conjunction with the example BT radio IC circuitry 1206*b*.

In some embodiments, the radio IC circuitry 1206*a* may include a receive signal path and a transmit signal path. The receive signal path of the radio IC circuitry 1206*a* may include at least mixer circuitry 1402, such as, for example, down-conversion mixer circuitry, amplifier circuitry 1406 and filter circuitry 1408. The transmit signal path of the radio IC circuitry 1206a may include at least filter circuitry 1412 and mixer circuitry 1414, such as, for example, upconversion mixer circuitry. Radio IC circuitry 1206a may also include synthesizer circuitry 1404 for synthesizing a frequency 1405 for use by the mixer circuitry 1402 and the mixer circuitry 1414. The mixer circuitry 1402 and/or 1414 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 14 illustrates only a simplified version of a radio IC circuitry, and may include, although not shown, embodiments where each of the depicted circuitries may include more than one component. For instance, mixer circuitry 1414 may each include one or more mixers, and filter circuitries 1408 and/or 1412 may each include one or more filters, such as one or more BPFs and/or LPFs according to application needs. For example, when mixer circuitries are of the direct-conversion type, they may each include two or more mixers.

In some embodiments, mixer circuitry 1402 may be configured to down-convert RF signals 1307 received from the FEM circuitry 1204a-b (FIG. 12) based on the synthesized frequency 1405 provided by synthesizer circuitry 1404. The amplifier circuitry 1406 may be configured to amplify the down-converted signals and the filter circuitry 1408 may include an LPF configured to remove unwanted signals from the down-converted signals to generate output baseband signals 1407. Output baseband signals 1407 may be provided to the baseband processing circuitry 1208a-b (FIG. 12) for further processing. In some embodiments, the output baseband signals 1407 may be zero-frequency baseband signals, although this is not a requirement. In some embodiments, mixer circuitry 1402 may comprise passive mixers, although the scope of the embodiments is not limited in this respect.

In some embodiments, the mixer circuitry 1414 may be configured to up-convert input baseband signals 1411 based on the synthesized frequency 1405 provided by the synthesizer circuitry 1404 to generate RF output signals 1309 for the FEM circuitry 1204a-b. The baseband signals 1411 may be provided by the baseband processing circuitry 1208a-b and may be filtered by filter circuitry 1412. The filter circuitry 1412 may include an LPF or a BPF, although the scope of the embodiments is not limited in this respect.

In some embodiments, the mixer circuitry 1402 and the mixer circuitry 1414 may each include two or more mixers and may be arranged for quadrature down-conversion and/or upconversion respectively with the help of synthesizer 1404. In some embodiments, the mixer circuitry 1402 and the mixer circuitry 1414 may each include two or more mixers each configured for image rejection (e.g., Hartley image rejection). In some embodiments, the mixer circuitry 1402 and the mixer circuitry 1414 may be arranged for direct down-conversion and/or direct upconversion, respectively. In some embodiments, the mixer circuitry 1402 and the mixer circuitry 1414 may be configured for super-heterodyne operation, although this is not a requirement.

Mixer circuitry 1402 may comprise, according to one embodiment: quadrature passive mixers (e.g., for the in-phase (I) and quadrature phase (Q) paths). In such an embodiment, RF input signal 1307 from FIG. 14 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1405 of synthesizer 1404 (FIG. 14). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1307 (FIG. 13) may comprise a balanced signal, although the scope of the embodiments is not limited in this respect. The I and Q baseband output signals may be provided to low-noise amplifier, such as amplifier circuitry 1406 (FIG. 14) or to filter circuitry 1408 (FIG. 14).

In some embodiments, the output baseband signals 1407 and the input baseband signals 1411 may be analog baseband signals, although the scope of the embodiments is not limited in this respect. In some alternate embodiments, the output baseband signals 1407 and the input baseband signals 1411 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1404 may be a fractional-N synthesizer or a fractional N/N+1 synthesizer, although the scope of the embodiments is not limited in this respect as other types of frequency synthesizers may be suitable. For example, synthesizer circuitry 1404 may be a delta-sigma synthesizer, a frequency multiplier, or a synthesizer comprising a phase-locked loop with a frequency divider. According to some embodiments, the synthesizer circuitry 1404 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1404 may be provided by a voltage controlled oscillator (VCO), although that is not a requirement. A divider control input may further be provided by either the baseband processing circuitry 1208a-b (FIG. 12) depending on the desired output frequency 1405. In some embodiments, a divider control input (e.g., N) may be determined from a look-up table (e.g., within a Wi-Fi card) based on a channel number and a channel center frequency as determined or indicated by the example application processor 1210. The application processor 1210 may include, or otherwise be connected to, one of the example secure signal converter 101 or the example received signal converter 103 (e.g., depending on which device the example radio architecture is implemented in).

In some embodiments, synthesizer circuitry 1404 may be configured to generate a carrier frequency as the output frequency 1405, while in other embodiments, the output frequency 1405 may be a fraction of the carrier frequency (e.g., one-half the carrier frequency, one-third the carrier frequency). In some embodiments, the output frequency 1405 may be a LO frequency (fLO).

Figure 15:
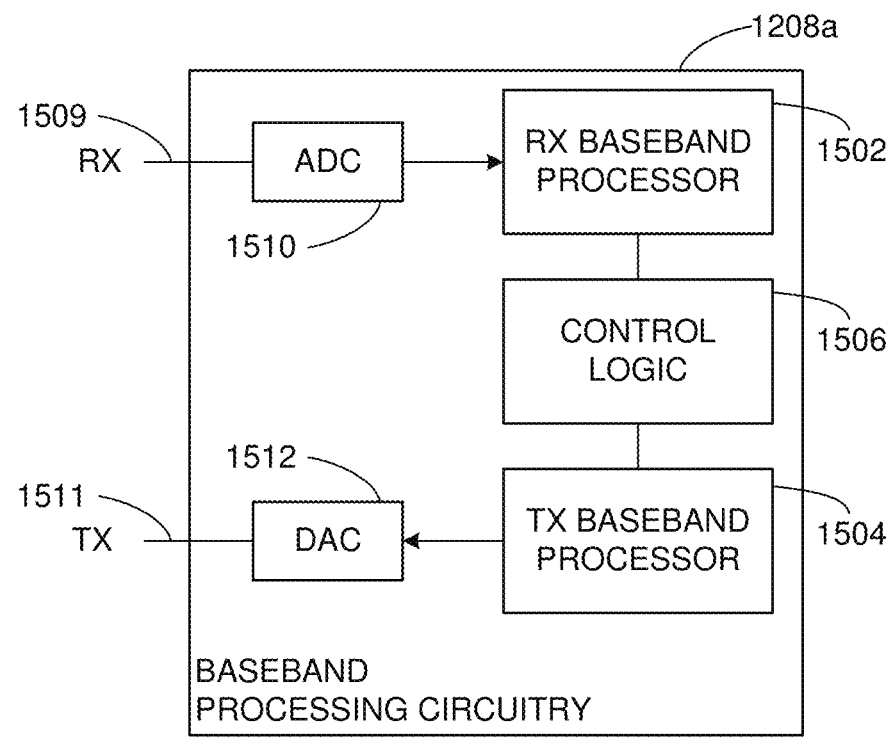
FIG. 15 illustrates an example of baseband processing circuitry for use in the radio architecture of FIG. 12, in accordance with one or more example embodiments of the present disclosure.

FIG. 15 illustrates a functional block diagram of baseband processing circuitry 1208a in accordance with some embodiments. The baseband processing circuitry 1208a is one example of circuitry that may be suitable for use as the baseband processing circuitry 1208a (FIG. 12), although other circuitry configurations may also be suitable. Alternatively, the example of FIG. 14 may be used to implement the example BT baseband processing circuitry 1208b of FIG. 12.

The baseband processing circuitry 1208a may include a receive baseband processor (RX BBP) 1502 for processing receive baseband signals 1409 provided by the radio IC circuitry 1206a-b (FIG. 12) and a transmit baseband processor (TX BBP) 1504 for generating transmit baseband signals 1411 for the radio IC circuitry 1206a-b. The baseband processing circuitry 1208a may also include control logic 1506 for coordinating the operations of the baseband processing circuitry 1208a.

In some embodiments (e.g., when analog baseband signals are exchanged between the baseband processing circuitry 1208a-b and the radio IC circuitry 1206a-b), the baseband processing circuitry 1208a may include ADC 1510 to convert analog baseband signals 1509 received from the radio IC circuitry 1206a-b to digital baseband signals for processing by the RX BBP 1502. In these embodiments, the baseband processing circuitry 1208a may also include DAC 1512 to convert digital baseband signals from the TX BBP 1504 to analog baseband signals 1511.

In some embodiments that communicate OFDM signals or OFDMA signals, such as through baseband processor 1208a, the transmit baseband processor 1504 may be configured to generate OFDM or OFDMA signals as appropriate for transmission by performing an inverse fast Fourier transform (IFFT). The receive baseband processor 1502 may be configured to process received OFDM signals or OFDMA signals by performing an FFT. In some embodiments, the receive baseband processor 1502 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 12, in some embodiments, the antennas 1201 (FIG. 12) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1201 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: establish communication channel with one or more station devices (STAs); generate an extreme high throughput signal field (EHT-SIG) of a header, wherein the EHT-SIG field comprises information associated with resource allocations (RUs); generate a frame comprising the header; assign a first RU to a first station device; assign a second RU to the first station device, wherein the first RU or the second RU may be an aggregation of a 26-tome RU and a neighboring RU; and cause to send the frame to the first station device.

Example 2 may include the device of example 1 and/or some other example herein, wherein the one or more EHT signaling fields comprise a common portion and a user-specific portion.

Example 3 may include the device of example 2 and/or some other example herein, wherein the common portion has a fixed length.

Example 4 may include the device of example 2 and/or some other example herein, wherein the user-specific portion has a variable length.

Example 5 may include the device of example 1 and/or some other example herein, wherein the one more resource allocations support 160 MHz resource allocation and 320 MHz resource allocation.

Example 6 may include the device of example 1 and/or some other example herein, wherein the first RU and the second RU are non-contiguous.

Example 7 may include the device of example 1 and/or some other example herein, wherein the first RU may be a 78-tone RU, 132-tone RU, or a 996×2 RU.

Example 8 may include the device of example 1 and/or some other example herein, further comprising a transceiver configured to transmit and receive wireless signals.

Example 9 may include the device of example 8 and/or some other example herein, further comprising an antenna coupled to the transceiver to cause to send the frame.

Example 10 may include a non-transitory computer-readable medium storing computer-executable instructions which when executed by one or more processors result in performing operations comprising: establishing a communication channel with one or more station devices (STAs); generating an extreme high throughput signal field (EHT-SIG) of a header, wherein the EHT-SIG field comprises information associated with resource allocations (RUs); generating a frame comprising the header; assigning a first RU to a first station device; assigning a second RU to the first station device, wherein the first RU or the second RU may be an aggregation of a 26-tome RU and a neighboring RU; and causing to send the frame to the first station device.

Example 11 may include the non-transitory computer-readable medium of example 10 and/or some other example herein, wherein the one or more EHT signaling fields comprise a common portion and a user-specific portion.

Example 12 may include the non-transitory computer-readable medium of example 11 and/or some other example herein, wherein the common portion has a fixed length.

Example 13 may include the non-transitory computer-readable medium of example 11 and/or some other example herein, wherein the user-specific portion has a variable length.

Example 14 may include the non-transitory computer-readable medium of example 10 and/or some other example herein, wherein the one more resource allocations support 160 MHz resource allocation and 320 MHz resource allocation.

Example 15 may include the non-transitory computer-readable medium of example 10 and/or some other example herein, wherein the first RU and the second RU are non-contiguous.

Example 16 may include the non-transitory computer-readable medium of example 10 and/or some other example herein, wherein the first RU may be a 78-tone RU, 132-tone RU, or a 996×2 RU.

Example 17 may include a method comprising: establishing, by one or more processors, communication channel with one or more station devices (STAs); generating an extreme high throughput signal field (EHT-SIG) of a header, wherein the EHT-SIG field comprises information associated with resource allocations (RUs); generating a frame comprising the header; assigning a first RU to a first station device; assigning a second RU to the first station device, wherein the first RU or the second RU may be an aggregation of a 26-tome RU and a neighboring RU; and causing to send the frame to the first station device.

Example 18 may include the method of example 17 and/or some other example herein, wherein the one or more EHT signaling fields comprise a common portion and a user-specific portion.

Example 19 may include the method of example 18 and/or some other example herein, wherein the common portion has a fixed length.

Example 20 may include the method of example 18 and/or some other example herein, wherein the user-specific portion has a variable length.

Example 21 may include the method of example 17 and/or some other example herein, wherein the one more resource allocations support 160 MHz resource allocation and 320 MHz resource allocation.

Example 22 may include the method of example 17 and/or some other example herein, wherein the first RU and the second RU are non-contiguous.

Example 23 may include the method of example 17 and/or some other example herein, wherein the first RU may be a 78-tone RU, 132-tone RU, or a 996×2 RU.

Example 24 may include an apparatus comprising means for: establishing communication channel with one or more station devices (STAs); generating an extreme high throughput signal field (EHT-SIG) of a header, wherein the EHT-SIG field comprises information associated with resource allocations (RUs); generating a frame comprising the header; assigning a first RU to a first station device; assigning a second RU to the first station device, wherein the first RU or the second RU may be an aggregation of a 26-tome RU and a neighboring RU; and causing to send the frame to the first station device.

Example 25 may include the apparatus of example 24 and/or some other example herein, wherein the one or more EHT signaling fields comprise a common portion and a user-specific portion.

Example 26 may include the apparatus of example 25 and/or some other example herein, wherein the common portion has a fixed length.

Example 27 may include the apparatus of example 25 and/or some other example herein, wherein the user-specific portion has a variable length.

Example 28 may include the apparatus of example 24 and/or some other example herein, wherein the one more resource allocations support 160 MHz resource allocation and 320 MHz resource allocation.

Example 29 may include the apparatus of example 24 and/or some other example herein, wherein the first RU and the second RU are non-contiguous.

Example 30 may include the apparatus of example 24 and/or some other example herein, wherein the first RU may be a 78-tone RU, 132-tone RU, or a 996×2 RU.

Example 31 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 32 may include an apparatus comprising logic, modules, and/or circuitry to perform one or more elements of a method described in or related to any of examples 1-26, or any other method or process described herein.

Example 33 may include a method, technique, or process as described in or related to any of examples 1-26, or portions or parts thereof.

Example 34 may include an apparatus comprising: one or more processors and one or more computer readable media comprising instructions that, when executed by the one or more processors, cause the one or more processors to perform the method, techniques, or process as described in or related to any of examples 1-26, or portions thereof.

Example 35 may include a method of communicating in a wireless network as shown and described herein.

Example 36 may include a system for providing wireless communication as shown and described herein.

Example 37 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
    establish a communication channel with one or more station devices;
    generate an extreme high throughput signal (EHT-SIG) field of a header, wherein the EHT-SIG field comprises information associated with one or more resource allocations (RUs), wherein the EHT-SIG field comprises a common portion and a user-specific portion, wherein the common portion has a fixed length;
    generate a frame comprising the header;
    assign a first RU to a first station device of the one or more station devices, wherein the first RU is indicated in the frame;
    assign a second RU to the first station device, wherein the first RU or the second RU is an aggregation of a 26-tone RU and a neighboring RU, wherein the second RU is indicated in the frame; and
    cause to send the frame to the first station device.

2. The device of claim 1, wherein the user-specific portion has a variable length.

3. The device of claim 1, wherein the one more resource allocations support 160 MHz resource allocation and 320 MHz resource allocation.

4. The device of claim 1, wherein the first RU and the second RU are non-contiguous.

5. The device of claim 1, wherein the first RU is a 78-tone RU, 132-tone RU, or a two-996 RU.

6. The device of claim 1, further comprising a transceiver configured to transmit and receive wireless signals.

7. The device of claim 6, further comprising an antenna coupled to the transceiver to cause to send the frame.

8. A non-transitory computer-readable medium storing computer-executable instructions which when executed by one or more processors result in performing operations comprising:
    establishing a communication channel with one or more station devices;
    generating an extreme high throughput signal (EHT-SIG) field of a header, wherein the EHT-SIG field comprises information associated with one or more resource allocations (RUs), wherein the EHT-SIG field comprises a common portion and a user-specific portion, wherein the common portion has a fixed length;
    generating a frame comprising the header;
    assigning a first RU to a first station device of the one or more station devices, wherein the first RU is indicated in the frame;
    assigning a second RU to the first station device, wherein the first RU or the second RU is an aggregation of a 26-tone RU and a neighboring RU, wherein the second RU is indicated in the frame; and
    causing to send the frame to the first station device.

9. The non-transitory computer-readable medium of claim 8, wherein the user-specific portion has a variable length.

10. The non-transitory computer-readable medium of claim 8, wherein the one more resource allocations support 160 MHz resource allocation and 320 MHz resource allocation.

11. The non-transitory computer-readable medium of claim 8, wherein the first RU and the second RU are non-contiguous.

12. The non-transitory computer-readable medium of claim 8, wherein the first RU is a 78-tone RU, 132-tone RU, or a two-996 RU.

13. A method comprising:
    establishing, by one or more processors, the communication channel with one or more station devices;
    generating an extreme high throughput signal (EHT-SIG) field of a header, wherein the EHT-SIG field comprises information associated with one or more resource allocations (RUs), wherein the EHT-SIG field comprises a common portion and a user-specific portion, wherein the common portion has a fixed length;
    generating a frame comprising the header;
    assigning a first RU to a first station device of the one or more station devices, wherein the first RU is indicated in the frame;
    assigning a second RU to the first station device, wherein the first RU or the second RU is an aggregation of a 26-tone RU and a neighboring RU, wherein the second RU is indicated in the frame; and
    causing to send the frame to the first station device.

14. The method of claim 13, wherein the user-specific portion has a variable length.

\* \* \* \* \*